(12) United States Patent
Gholmieh et al.

(10) Patent No.: US 10,127,263 B2
(45) Date of Patent: Nov. 13, 2018

(54) FULL FILE REPAIR USING SCHEDULE DESCRIPTION FRAGMENT IN EMBMS

(71) Applicant: QUALCOMM Incorporated, San Diego, CA (US)

(72) Inventors: Ralph Akram Gholmieh, San Diego, CA (US); Nagaraju Naik, San Diego, CA (US); Nikolai Konrad Leung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/289,544

(22) Filed: May 28, 2014

(65) Prior Publication Data

US 2014/0358866 A1 Dec. 4, 2014

Related U.S. Application Data

(60) Provisional application No. 61/829,202, filed on May 30, 2013.

(51) Int. Cl.
| | | |
|---|---|---|
| *G06F 17/30* | (2006.01) | |
| *H04L 29/08* | (2006.01) | |
| *H04L 12/18* | (2006.01) | |
| *H04W 4/06* | (2009.01) | |
| *H04L 5/00* | (2006.01) | |

(52) U.S. Cl.
CPC ...... *G06F 17/30371* (2013.01); *H04L 12/189* (2013.01); *H04L 12/1859* (2013.01); *H04L 12/1868* (2013.01); *H04L 67/06* (2013.01); *H04L 67/325* (2013.01); *H04W 4/06* (2013.01); *H04L 5/0053* (2013.01)

(58) Field of Classification Search
USPC ................................................. 707/687, 691
See application file for complete search history.

(56) References Cited

U.S. PATENT DOCUMENTS

| | | | | |
|---|---|---|---|---|
| 9,838,145 | B2 * | 12/2017 | Tawfiq Moshtaha | ........................ G06Q 30/02 |
| 9,838,851 | B2 * | 12/2017 | Huang | ................... H04W 4/06 |
| 9,877,166 | B2 * | 1/2018 | Phan | ...................... H04W 4/06 |
| 9,930,639 | B2 * | 3/2018 | Mochizuki | .......... H04W 72/005 |

(Continued)

FOREIGN PATENT DOCUMENTS

| | | |
|---|---|---|
| CN | 101589630 A | 11/2009 |
| JP | 2002232478 A | 8/2002 |
| JP | 2011254410 A | 12/2011 |

OTHER PUBLICATIONS

International Search Report and Written Opinion—PCT/US2014/040010—ISA/EPO—dated Jul. 22, 2014.
3GPP: "3rd Generation Partnership Project; Technical Specification Group Services and System Aspects; Multimedia roadcast/Multicast Service; Protocols and Codecs (release 6)", 3GPP Organizational Partners, 3GPP TS 26.346 Version 1.9.0 Technical Specification, Feb. 28, 2005, 650 Route Des Lucioles, Sophia Antipolis, Valbonne, France, 46 pages.

(Continued)

*Primary Examiner* — Kim Nguyen
(74) *Attorney, Agent, or Firm* — Arent Fox, LLP

(57) ABSTRACT

A method, an apparatus, and a computer program product for wireless communication are provided. The apparatus determines that a file of interest is transmitted within a service, determines a failure to download the file of interest, and triggers a repair procedure of the file of interest at a time corresponding to an end of a file delivery event, wherein the time is derived from one or more information elements included in broadcast schedule description.

6 Claims, 15 Drawing Sheets

(56) References Cited

U.S. PATENT DOCUMENTS

| | | | |
|---|---|---|---|
| 2005/0204045 A1* | 9/2005 | Belkin | G06F 9/5027 |
| | | | 709/227 |
| 2006/0067353 A1 | 3/2006 | Pekonen et al. | |
| 2006/0221882 A1 | 10/2006 | Jung et al. | |
| 2008/0307041 A1 | 12/2008 | Bouazizi et al. | |
| 2008/0313191 A1 | 12/2008 | Bouazizi | |
| 2009/0240701 A1 | 9/2009 | Gautier et al. | |
| 2013/0144986 A1 | 6/2013 | Yamada et al. | |
| 2013/0232545 A1* | 9/2013 | Ma | G06F 21/6218 |
| | | | 726/3 |
| 2014/0059604 A1* | 2/2014 | Kim | G06T 19/006 |
| | | | 725/38 |
| 2015/0189544 A1* | 7/2015 | Chen | H04L 1/08 |
| | | | 370/230 |
| 2015/0278022 A1* | 10/2015 | Chen | H04W 4/06 |
| | | | 714/15 |

OTHER PUBLICATIONS

3GPP TS 26346: 3rd Generation Partnership Project; Technical Specification Group Services and System Aspects; Multimedia Broadcast/Multicast Service (MBMS); Protocols and codecs (Release 11), V11.4.0 (Mar. 2013), Mar. 8, 2013, pp. 1-8, 18-22, 24-28, 36, 37, 48-51, 65-74, 114, 115, 121 (Sections 4.4, 5.2.2, 5.2.3, 5.6, 7.3, 8.3, 11.2A.1, 11.2B.2.), URL, http://www.3gpp.org/ftp/Specs/archive/26_series/26.346/26346-b40.zip.

* cited by examiner

FULL FILE REPAIR USING SCHEDULE DESCRIPTION FRAGMENT IN EMBMS

CROSS-REFERENCE TO RELATED APPLICATION(S)

This application claims the benefit of U.S. Provisional Application Ser. No. 61/829,202, entitled "Full File Repair Using Schedule Description Fragment In eMBMS" and filed on May 30, 2013, which is expressly incorporated by reference herein in its entirety.

BACKGROUND

Field

The present disclosure relates generally to communication systems, and more particularly, to full file repair (e.g., download of an entire file) using a schedule description fragment for a file delivered via eMBMS.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines that a file of interest is transmitted within a service, determines a failure to download the file of interest, and triggers a repair procedure of the file of interest at a time corresponding to an end of a file delivery event. The time is derived from one or more information elements included in a broadcast schedule description. In one implementation, the file delivery event includes a file broadcast, the information element includes a file schedule element included in a broadcast schedule description, and the time corresponds to the end of the file broadcast, as provided by the end attribute of the file schedule element. In another implementation, the file delivery event includes a session broadcast, the information element includes a session schedule element included in a broadcast schedule description, and the time corresponds to the end of the session broadcast, as provided by the stop attribute of the session schedule element.

DETAILED DESCRIPTION

Figure 1:
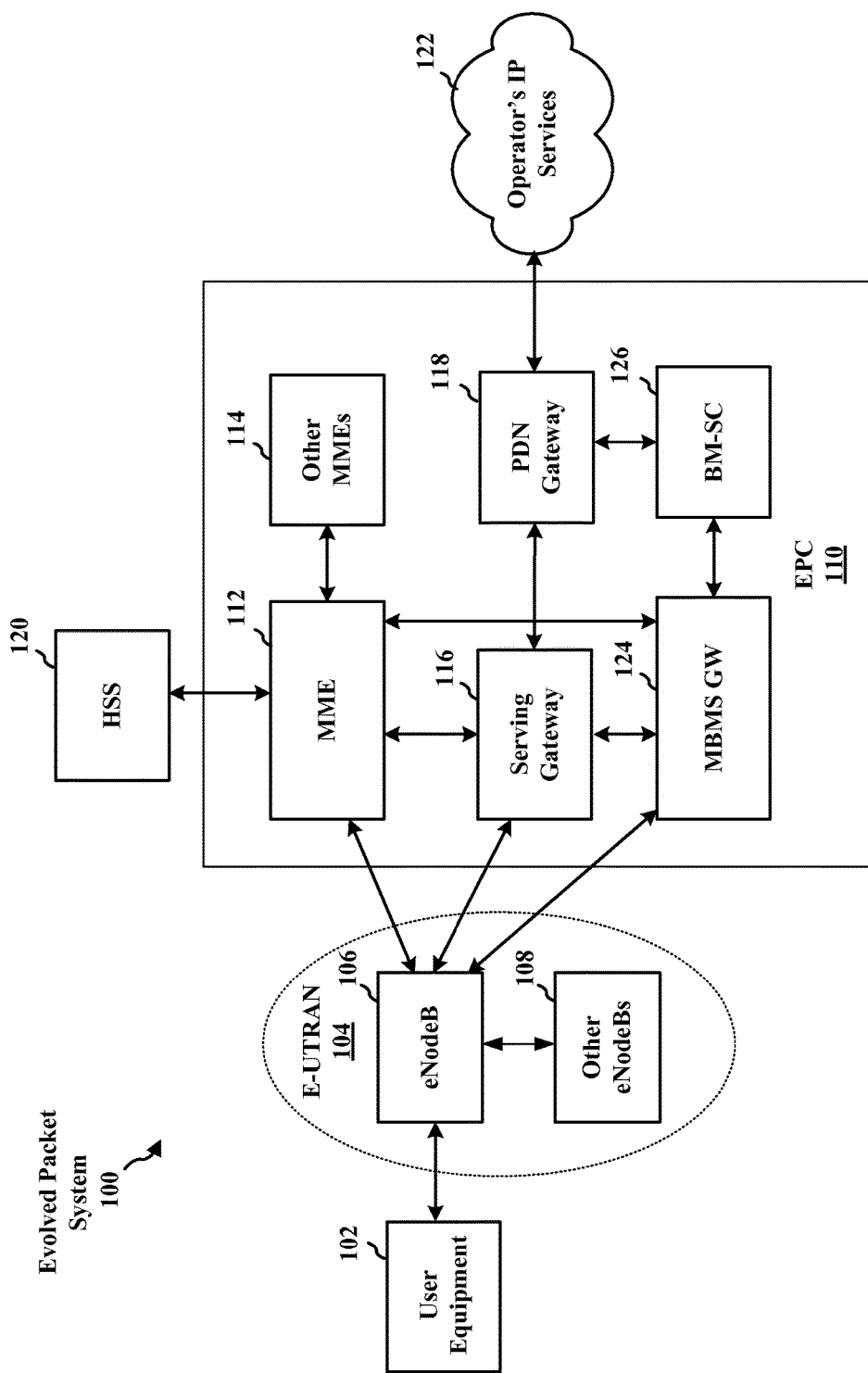
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets may be transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
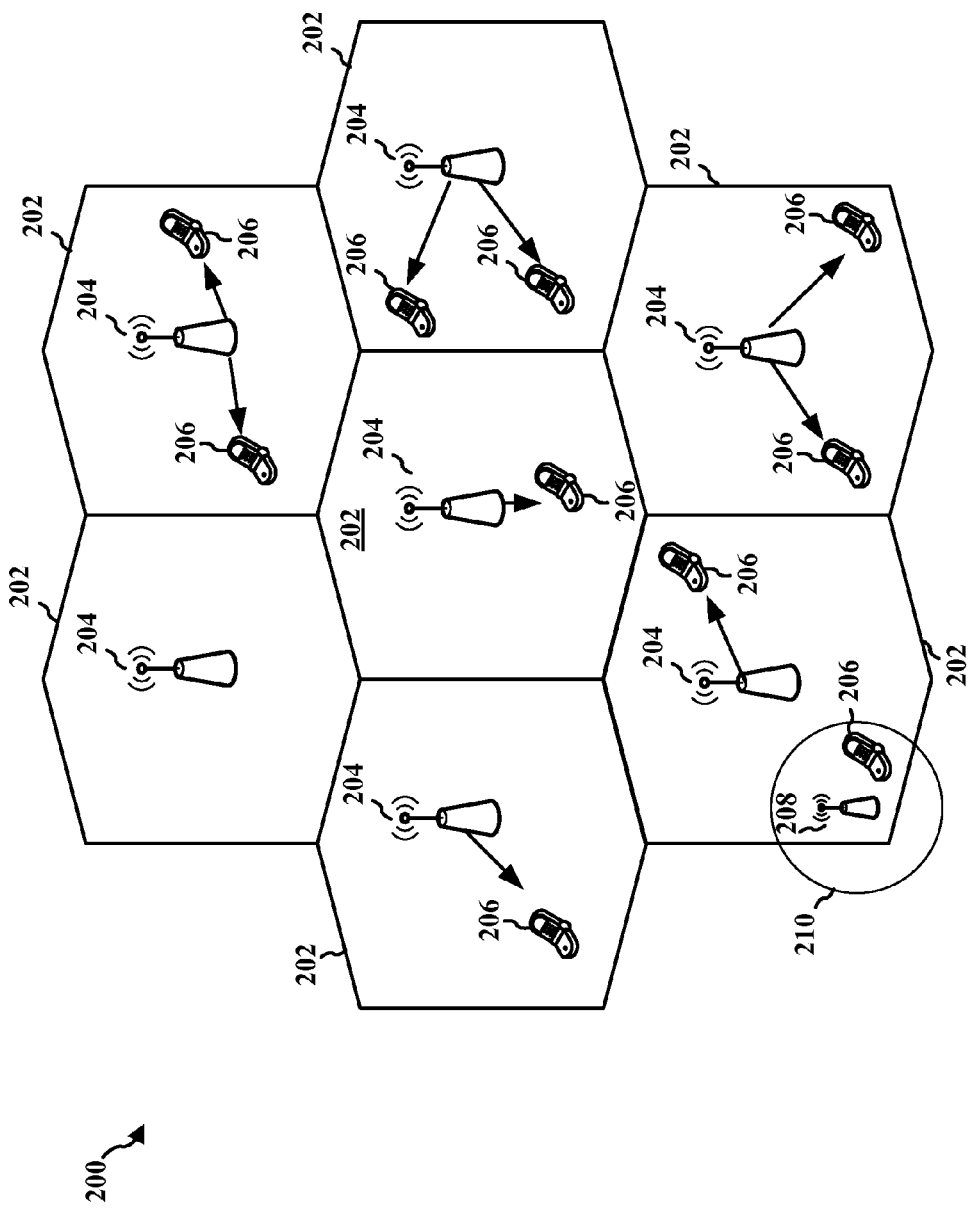
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving a particular coverage area depending upon the context in which the term is used. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
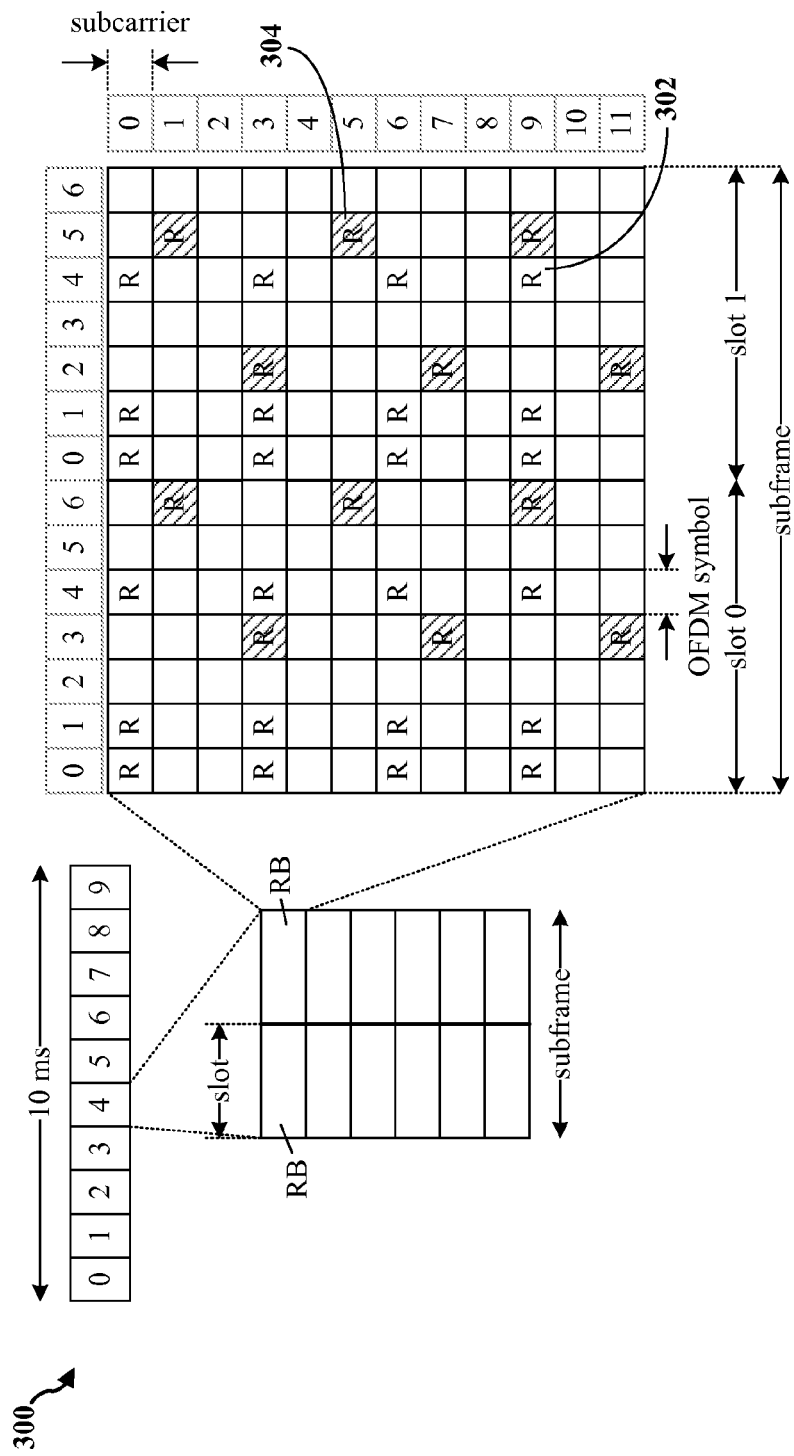
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 is transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
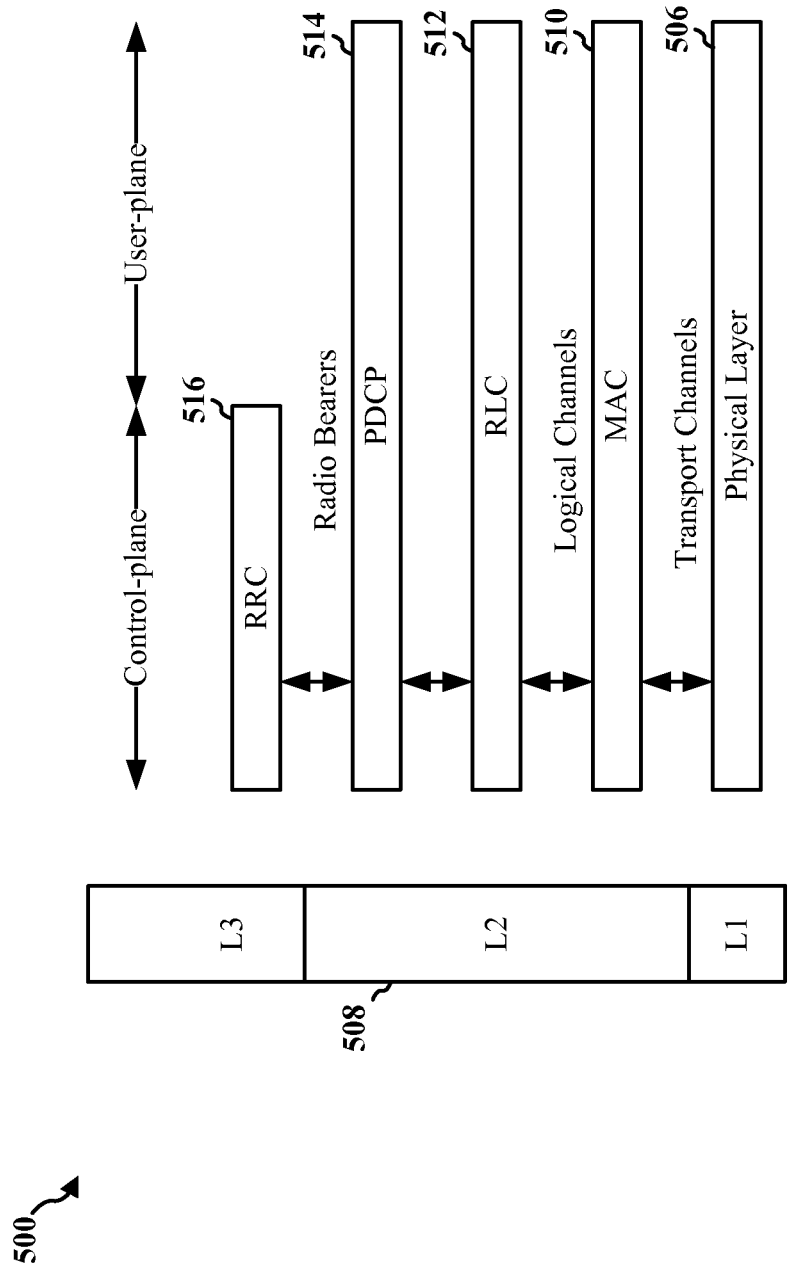
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3.

Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
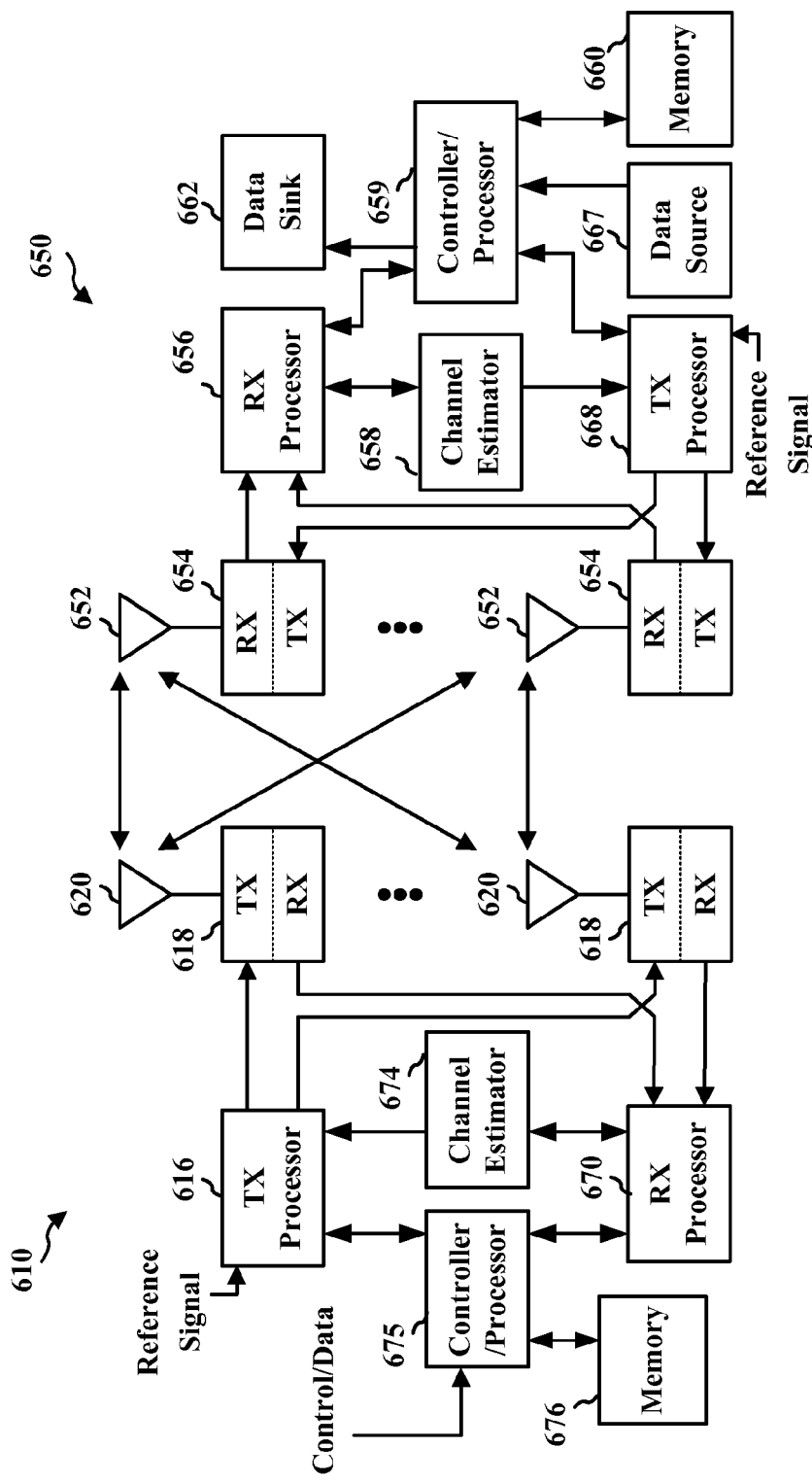
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
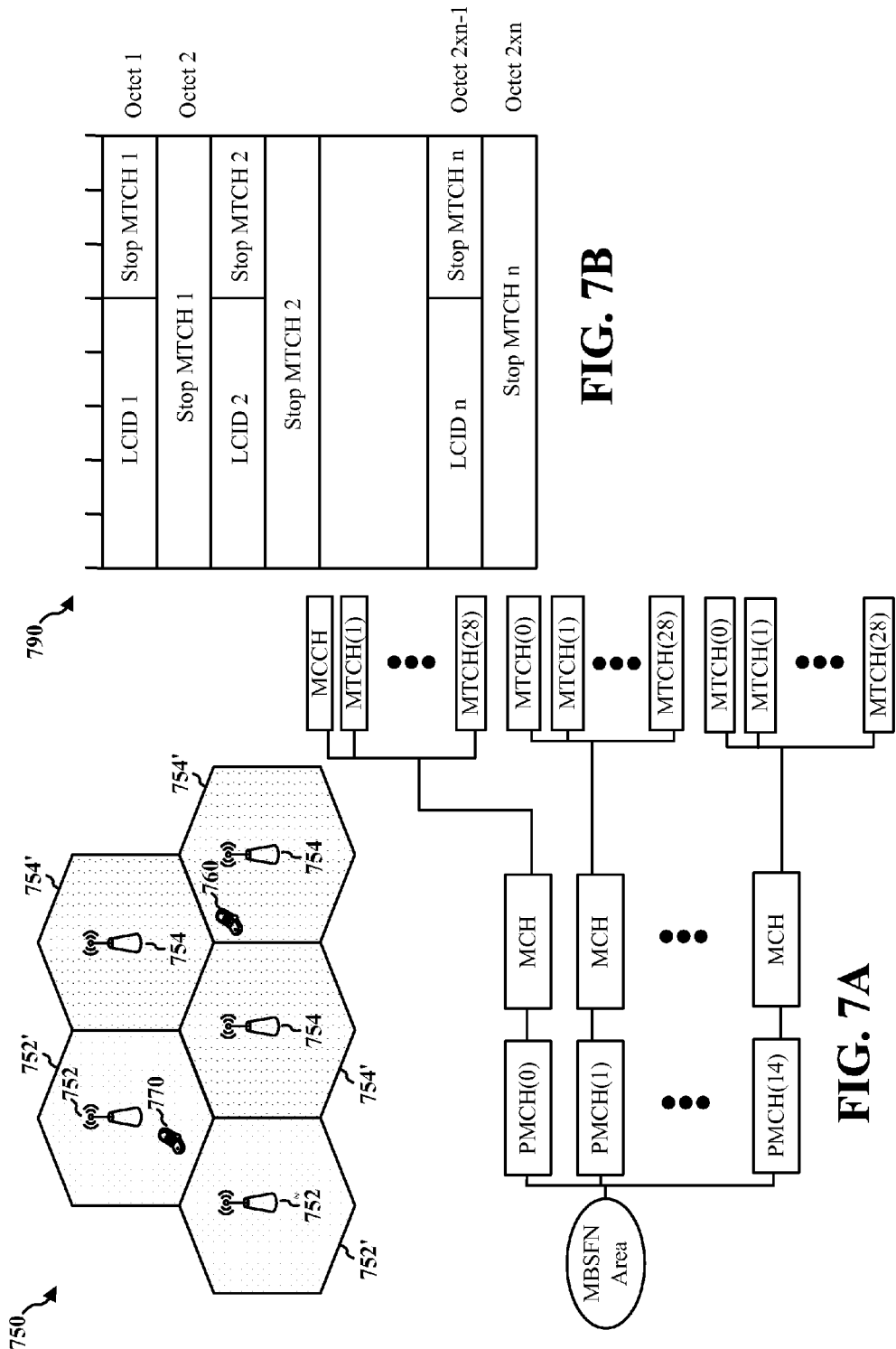
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates both (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 8:
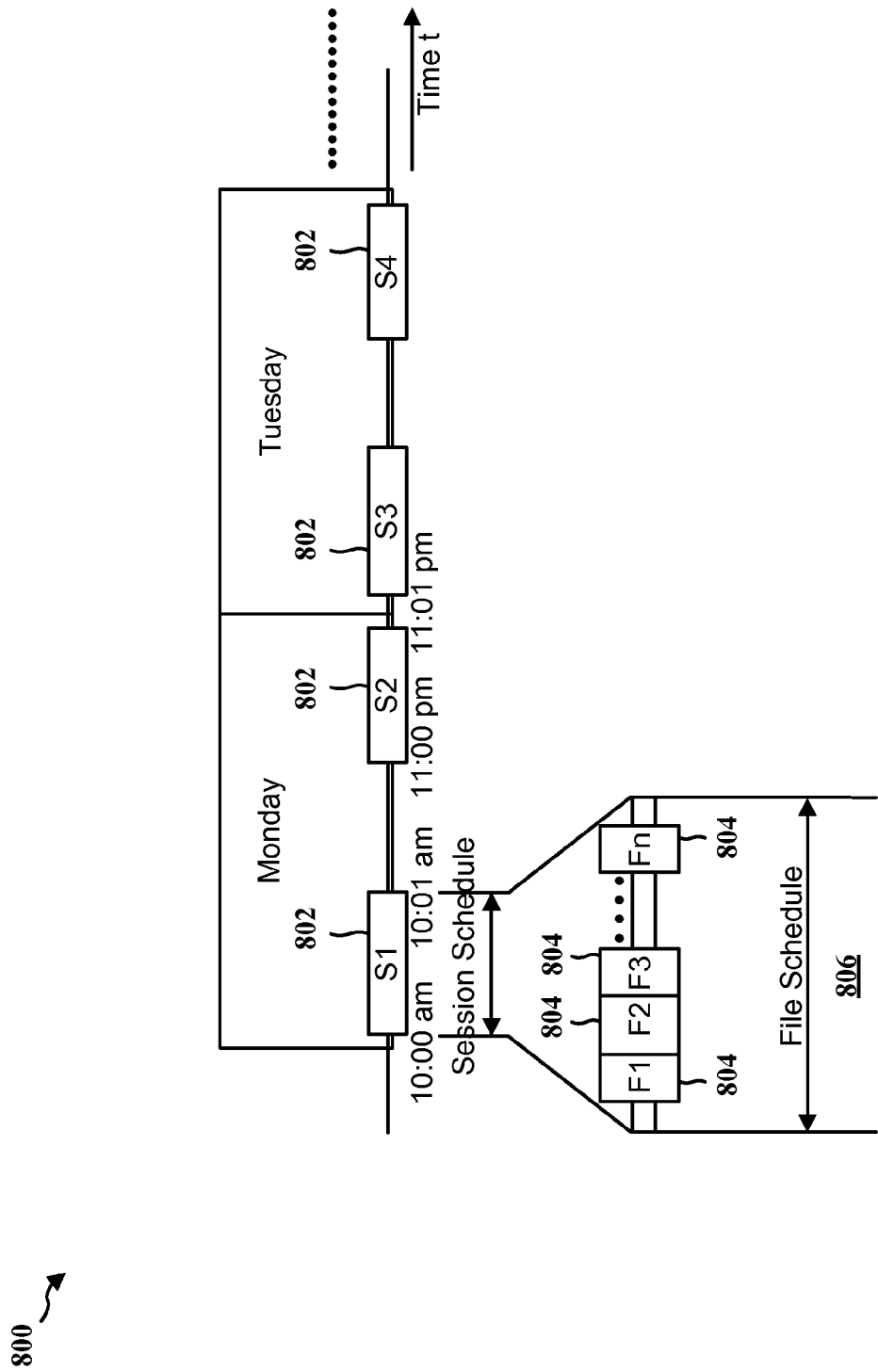
FIG. 8 is an illustration of a session schedule including file schedules within the session.

FIG. 8 is an illustration 800 of a portion of a schedule for session and file broadcasts over an eMBMS broadcast. The schedule includes a number of individual session schedules 802 having one-minute durations. During each session schedule 802, one or more files 804 may be broadcast in accordance with a file schedule 806. Information related to the session schedule 802 and the file schedule 806 may be included in a service announcement broadcast by an eMBMS server. Information included in the file schedule 806 may specify specific blocks of time within the sessions, during which specific files 804 will be broadcast.

A UE may have a previously downloaded a version of a file 804 that is periodically updated, or may be a subscriber to a service that periodically broadcasts files. For example, a UE may have a particular version of a file, e.g., application, operating system, etc., that is periodically updated by the developer of the file, or the UE may subscribe to a news service that broadcasts files of news stories periodically, e.g., every hour. In a typical eMBMS scenario, an updated version of a file (or new files) may initially be broadcast in the eMBMS service area in accordance with information provided in a service announcement received by the UE prior to broadcast of the file. For example, the service announcement may include a schedule description fragment, which typically includes information corresponding to a session schedule 802 and a file schedule 806. The service announcement may also be received by the UE over a unicast transmission. A file scheduled to be broadcast may be a "file of interest" to a UE. For example, an application on the UE may express interest in receiving files that meet certain criteria on an eMBMS service. A typical criterion is a file name or files in a directory; examples could be all files in the weather folder of a news service. UE may or may not have a version of the file which may or may not be the latest version of the file.

During the time between receipt of the service announcement by the UE and the scheduled eMBMS broadcast of a file of interest, the UE may fall out of service or out of coverage of the eMBMS broadcast and thus not receive the file of interest. "Out of coverage," relates to cases where the UE moves to an area that is outside of the broadcast area of the eMBMS broadcast. "Out of service" relates to cases where the UE is in a location, e.g., a fringe area of cell or pocket of cell, where the UE cannot reliably receive the broadcast signal, e.g., because the signal strength is too low. That is, the signal may be too weak for the UE to decode the incoming transmission. In either case, the UE does not receive the file of interest and may not receive any partial data at all for the file. Furthermore, the UE may not receive the file delivery table (FDT) instance associated with the file, which lists a set of files, possible signature of the files (in the form of a MD5 hash in the case of FDT), and the corresponding transport options.

Following are several example scenarios where a UE does not receive the file of interest or its associated FDT instance:

1) The UE is tuned to another frequency—Sam is subscribed to a real-time "BBA Live" basketball MBMS video service which allows her to watch live basketball games on her device. The real-time service is broadcast over MBMS using frequency band 1. Sam's mobile device is also configured to receive software updates via an MBMS Firmware Over the Air (OTA) service that is broadcast on frequency band 2. Sam has been watching a live BBA game on her device during the time that a firmware download for her device has been scheduled for delivery over the MBMS Firmware OTA service. Having missed the broadcast delivery window for the file while Sam was watching the game, the device retrieves the software update from a file repair server.

2) The UE is powered-off—Tom is a news junkie who is subscribed to the "CNN" news service which periodically broadcasts news articles throughout the day. Tom regularly commutes between Boston and San Diego for work every week and is diligent about placing his phone in "airplane mode" when he flies. During his flights Tom's phone is unable to download the news articles that are broadcast while he is in the air. When Tom lands he disables "airplane mode" and his device downloads the missing news articles from the file repair server so that Tom can start catching up on his news feed.

3) The UE is out of MBMS coverage but in good unicast coverage—Beth is a postwoman who delivers mail in some areas without eMBMS coverage (e.g., the MBMS signal is weak). Her GPS relies on broadcast traffic updates for route selection. While in the areas with low coverage, the device downloads missing traffic updates from the file repair server so that Beth's GPS can select the best travel routes.

In cases where a UE does not receive a file of interest, the UE may implement a full file repair. "Full file repair" relates to a full download of the file of interest from a file repair server. File repair in eMBMS is currently triggered by the expiry time of a FDT instance within the file delivery over unidirectional transport (FLUTE) protocol. The existing file repair approach requires the device to access the eMBMS bearer carrying the eMBMS server and download an FDT before being able to initiate file repair. However, in the scenarios described above, the FDT is not available at the UE. Accordingly, current full file repair techniques are not applicable for recovering files for which no FDT is received.

With the addition of a schedule fragment in the eMBMS service announcement, the UE may be aware of sessions and file schedules without necessarily accessing the service and consequently without obtaining the FDT. Described below are techniques applicable to the above three scenarios (and other similar scenarios) that allow a UE to implement a full file repair of a file of interest from a file repair server in cases where the UE is unable to receive the file of interest and the FDT instance for the file, over the broadcast channel during the scheduled delivery of the file. In the disclosed techniques, the UE may obtain the associated delivery procedure description fragment and/or the schedule description fragment for a file of interest. These may be obtained by the UE through an eMBMS service announcement while the UE is in eMBMS coverage, or through a unicast transmission to the UE. For example, the UE may receive the service announcement while in eMBMS service coverage, prior to falling out of coverage or out of service and "missing" the broadcast of the file of interest. Alternatively, the UE may receive the service announcement after the broadcast of the file of interest. "Missing a broadcast", as used herein, refers to an instance where a UE is unable to receive the transmission of a file of interest through an eMBMS service whereby no FDT is received for the file as exemplified in the discussed scenarios.

Figure 9:
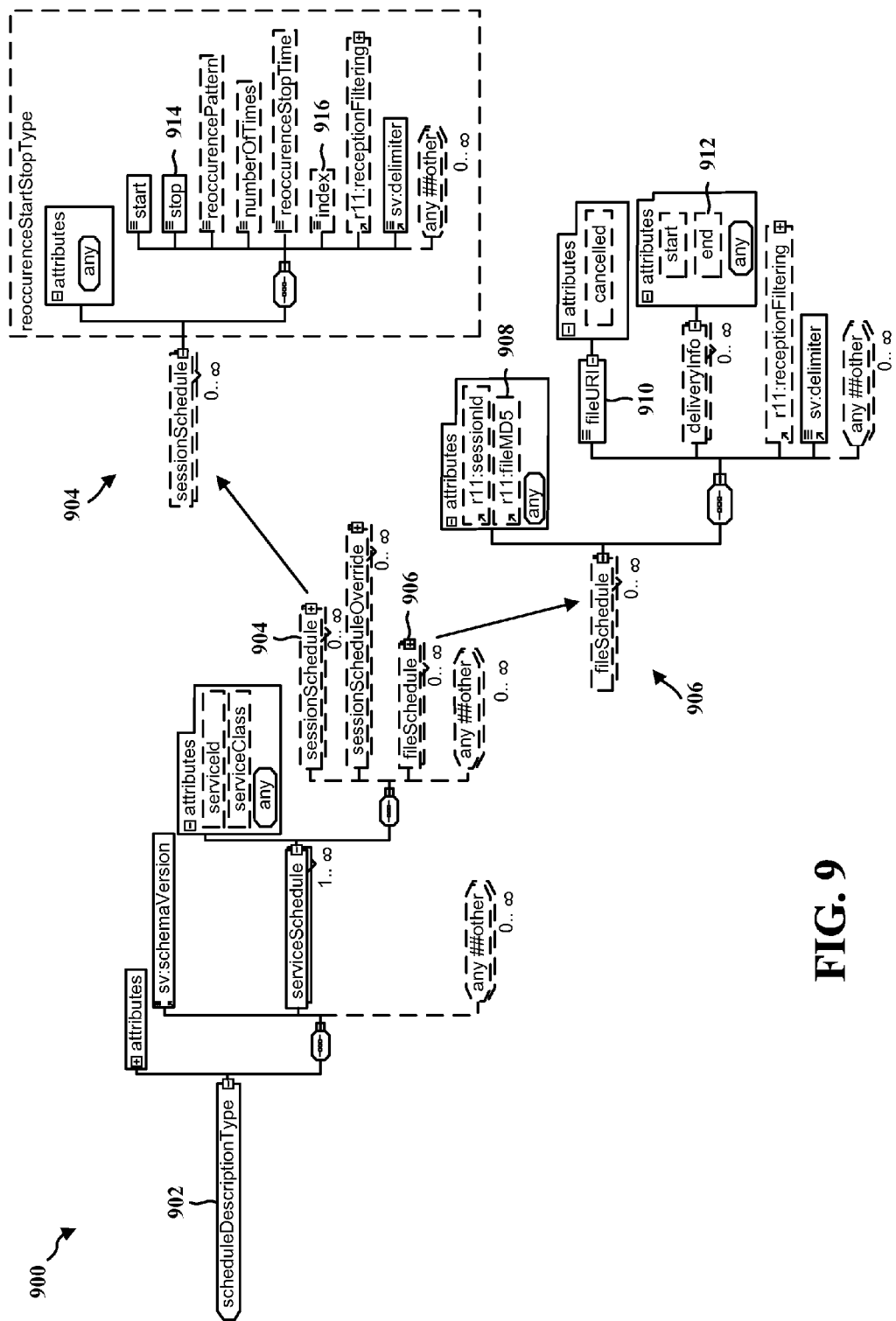
FIG. 9 is a graphical illustration of the XML schema of a schedule description fragment.

FIG. 9 is a graphical illustration 900 of the XML schema of a schedule description fragment 902. The schedule description fragment 902 may be included in a service announcement received by the UE. Based on information included in the schedule description fragment 902, the UE is able to determine if the UE missed a file of interest. The schedule description fragment 902 includes a session schedule element 904 for the session in which the file of interest is broadcast, and may include a file schedule element 906 for the file of interest. If a file schedule 906 is present, the file schedule may include file version information. For example, the file schedule 906 may have a message digest 5 (MD5) 908 of the file, which identifies the version of the file.

To determine whether a UE missed a file of interest, the UE may monitor the schedule description fragment 902 for file identification information corresponding to a file of interest. For example, the session schedule element 904 may provide the broadcast schedule of the file of interest. The file schedule 906 may include a MD5 908 for the file of interest that identifies the version of the file of interest scheduled for download. Based on this information, the UE compares the version of the file of interest that it currently has, to the version scheduled for download to determine if the UE missed a file of interest and should implement a full file repair. In some cases, however, the schedule description fragment 902 may not include information sufficient to determine if a file of interest was missed. For example, a file schedule 906 may not include a MD5, or the file schedule 906 itself may not be included in the session description 902.

Depending on the whether the file schedule 906 is available, and further depending on what information is included in the file schedule, different techniques are disclosed for determining whether a file of interest was missed and for implementing a full file repair. In summary, in these techniques the UE may determine whether a file of interest was missed and if missed, trigger a full file repair based on information included in a schedule description fragment (e.g. file identification information included in a session schedule and file version information included in a file schedule), based on information included in, or obtained through, a schedule description fragment (e.g., a file identification included directly in a session schedule and location information that directs the UE to file version information), based on queries for additional file information, or based on requests for the file of interest from symbol-based repair servers and conventional HTTP servers.

File Repair Based on File Information in Schedule Description:

With continued reference to FIG. 9, a UE may trigger a full file repair based solely on information included in a schedule description metadata fragment 902. The schedule description fragment 902 may include a session schedule element 904, a file schedule element 906 including a MD5

908, and retransmission schedules. In this implementation, the schedule description fragment 902 may be used to determine one or both of the end of a session and the end of a file transmission. Reception reporting may also report failure if a file is not downloaded at the end of the scheduled transmission in the schedule description.

The schedule description fragment 902 describes the transmission of sessions and files. The schedule description fragment 902 may include a session schedule element (sessionSchedule) 904 and a file schedule element (fileSchedule) 906. The file schedule element 906 allows the UE to determine if a file of interest is transmitted. Furthermore, the MD5 908 within the file schedule element 906 allows the UE to determine if a new version of a file of interest is transmitted or scheduled to be transmitted in case the UE had already downloaded the file of interest previously.

A UE may implement full file repair using information in the schedule description fragment 902 as follows: First, the UE determines that a file included in the file schedule 906 is a file of interest. For example, while within eMBMS coverage, the UE may receive a service announcement that includes broadcast information, e.g., a session schedule 904 and a file schedule 906, for one or more files. Based on the broadcast information, the UE determines if one of the files to be broadcast is a file of interest. The UE may make this determination by checking for a new file or updated MD5 908 for a uniform resource identifier (URI) 910 of interest in the file schedule 906.

Next, during the schedule broadcast of the file of interest, the UE tries to access the corresponding eMBMS bearer to initiate download of the file of interest. If the UE is out of service or out of coverage of the eMBMS or the frequency on which the file is broadcast via eMBMS is inaccessible to the UE, then the UE is unable to download the file of interest. In this case, the UE may trigger full file repair at file schedule end or session schedule end. For example, the UE may start full file repair when the end of the file transmission time is reached. The end of the file transmission time may be included in the end attribute 912 of the file schedule element 906. Alternatively, the UE may start full file repair at the end of the session containing the file of interest. Accordingly, the UE may trigger file recovery at file schedule end or session schedule end, even when the FDT instance is not received.

Thus, in this procedure, the UE determines that a file of interest is transmitted within a service based on the file schedule information. To this end, the UE requires file information to include a file schedule and optionally a session schedule as well. The UE processes the file information to determine if any files identified in the file information correspond to a file of interest. For example, if the file information identifies a file in the weather director of a news service and an application has already requested the reception of such files, then the UE would identify such files as files of interest.

Next, the UE determines a failure to download the file of interest. To this end, the UE, having knowledge of the broadcast schedule of the file of interest, may attempt to establish an eMBMS bearer by which to receive the file. If establishment of the bearer fails or if multiple such attempts fails for part or for the total duration of the broadcast of the file according to the schedule description, then the UE would determine a failure to download the file of interest. In another possible implementation, the UE may determine a failure to download a file of interest, subsequent to the scheduled broadcast, by comparing the version of the file currently on the UE with the version of the file of interest broadcast during the session as announced in the schedule description. If the versions do not match, then the UE may conclude there was a failure to download the file of interest.

Next, if there was a failure to download a file of interest, the UE may trigger a repair procedure of the file of interest at a time corresponding to an end of a file delivery event. To this end, the UE establishes a connection with the file repair server where the file of interest is located and requests the file. The UE may receive the file from the file repair server through a unicast transmission.

In one implementation of the foregoing, the file delivery event includes a file broadcast, the information element includes a file schedule element 906 included in a broadcast schedule description 902, and the time of the repair trigger corresponds to the end of the file broadcast, as provided by the end attribute 912 of the file schedule element 906. In another implementation, a UE obtains a broadcast schedule description 902 including a file schedule 906 for a file of interest, and triggers a full file repair procedure of the file of interest at a time based on an end attribute 912 included in the file schedule.

In another implementation, the file delivery event includes a session broadcast, the information element includes a session schedule element 904 included in a broadcast schedule description 902, and the time of the repair trigger corresponds to the end of the session broadcast, as provided by the stop attribute 914 of the session schedule element 904. In yet another implementation a UE obtains a broadcast schedule description 902 including a session schedule 904 for a file of interest, and triggers a full file repair procedure of the file of interest at a time based on a stop attribute 914 included in the session schedule.

File Repair Based on FDT (File Schedule Unavailable):

As previously mentioned, a file schedule may not be included in a schedule description fragment 902. For example, in some cases the number of files to be broadcast during a session may be too numerous to include in a file schedule. In these cases, the UE may determine from application preferences that a file of interest may be broadcast during an upcoming session. When the UE is able to receive eMBMS, the UE activates the bearer carrying the service at the beginning of the session, receives all file transmissions of files of interest during the session and deactivates the bearer at the end of the session. When the UE is unable to activate the bearer at the beginning or during the session (in the cases where full file repair is needed), the UE is unable to obtain the list of files that are broadcast in the session, and is therefore unable to determine if a file of interest is actually included in the session. In accordance with a technique, a UE may obtain file information based on FDT information included in a session schedule element 904, and trigger a full file repair of a file broadcast during the session if the UE determines the one or more files is a file of interest.

Figure 10:
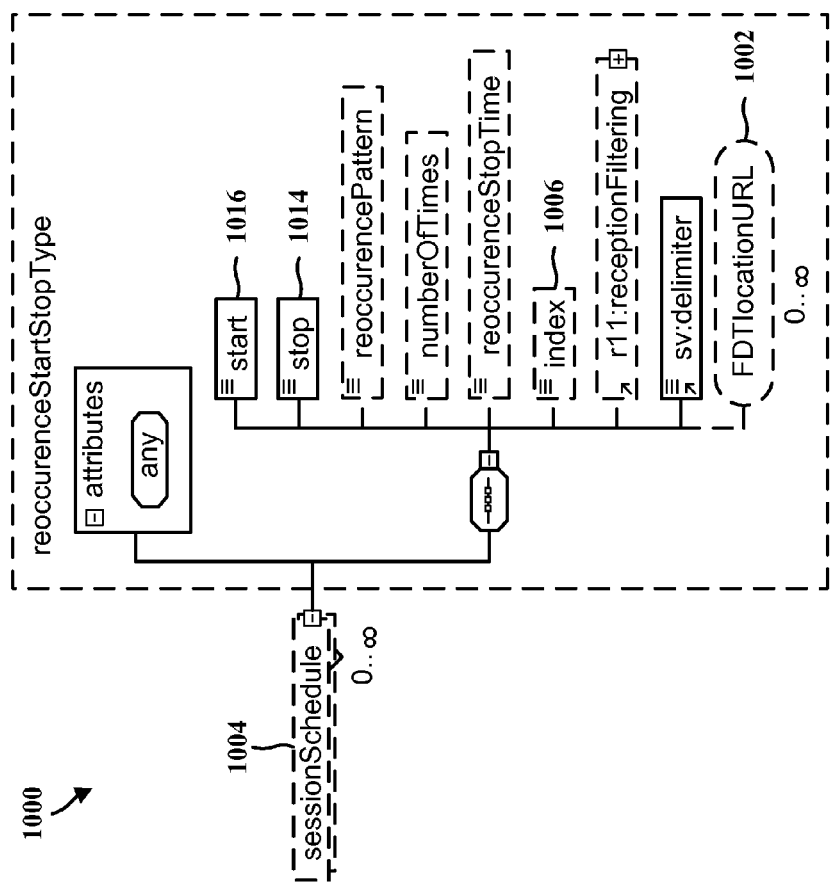
FIG. 10 is an illustration of a session schedule including a FDT location URI attribute.

In one configuration, and with reference to FIG. 10, file information is provided by an FDT location URI 1002 included in a session schedule element 1004. The FDT location URI 1002 may be available at broadcast start (as indicated by the start attribute 1016), at broadcast end (as indicated by the stop attribute 1014), or at broadcast end plus an offset time. The latter availability option is preferred since this is when the file repair files are available on the file repair server in the current standard operating protocols.

The FDT location URI may include information that describes all of the files transmitted during the broadcast session. The FDT location URI 1002 can be a template parameterized by sessionIndex 1006. For example, the FDT location URI 1002 may include file information that is categorized by session number. For example, a URI may be http\\provider.com\filedeliveryservice\FDT1, for session 1, http\\provider.com\filedeliveryservice\FDT2, for session 2, http\\provider.com\ filedeliveryservice\FDT3, for session 3, etc.

A UE may implement full file repair based on a FDT when a file schedule is not available as follows: First, the UE determines applications are interested in files on a broadcast service with session schedule announced in a service announcement. For example, based on information included in a service announcement, the UE may determine that a file of interest may be broadcast on a corresponding eMBMS bearer.

Next, the UE tries to access the eMBMS bearer to initiate file download. If the UE is out of service due to a weak eMBMS signal, or the UE is out of coverage of the eMBMS broadcast, or the UE is unable to switch to the frequency on which the service is broadcast, or the UE cannot receive the eMBMS broadcast for any other reason (radio resource issues, too many bearers active, etc) then the UE is unable to download the file of interest. In this case, the UE queries for the FDT information, e.g., the FDTlocationURI attribute 1002, of the session schedule 1004 to determine whether a file of interest was broadcast during the session. The UE may have to wait until the end of the broadcast session plus an offset time, where the session end is provided by the stop attribute 1014 of the session schedule 1004. Next, based on the FDT information the UE determines the files in the session and their MD5s, if specified. For example the UE may review the files listed as URIs and each file's corresponding MD5 version to determine if any of the files are new or if any of the file correspond to newer versions of files present on the UE. If a file of interest is found (a new file or a newer version of a file), the UE triggers a full file repair for the file of interest. The full file repair may be triggered at the end of the broadcast session. The end of the broadcast session may be determined based on information included in the session schedule.

Thus, in this procedure, the UE determines that a file of interest is transmitted within a service. To this end, the UE may obtain file broadcast information, e.g., a service announcement, including a schedule description fragment having a session schedule with location information of where a FDT is located, and process this information by accessing the FDT and determining if any files identified in the file broadcast information correspond to a file of interest that is listed in the FDT. Based on the session schedule, the UE may determine that a file of interest may be broadcast during the session. Based on the FDT location information obtained through the session schedule, the UE may determine if a file of interest was actually broadcast during the session. In one implementation of the foregoing, the UE determines that a file of interest is transmitted within a service based at least in part on information included in a FDT obtained through an FDT locator 1002 included in a schedule description of a session. For example, the FDT locator 1002 may be in a session schedule 1004 element of a schedule description fragment. In another implementation, a UE obtains a broadcast schedule description including a session schedule 1004 for a file of interest and retrieves a FDT for the file of interest based on a FDT URI 1002 included in the session schedule.

Next, the UE determines a failure to download the file of interest. To this end, as described above, the UE determines that it cannot access the eMBMS bearer to initiate a download and then queries for FDT information.

Next, if there was a failure to download a file of interest, the UE may trigger a repair procedure of the file of interest at a time corresponding to an end of a file delivery event. To this end, the UE establishes a connection with the file repair server where the file of interest is located and requests the file. The UE may receive the file from the file repair server through a unicast transmission. The UE triggers a repair procedure of the file of interest at a time based on a stop attribute 1014 included in the session schedule 1004.

Figure 11:
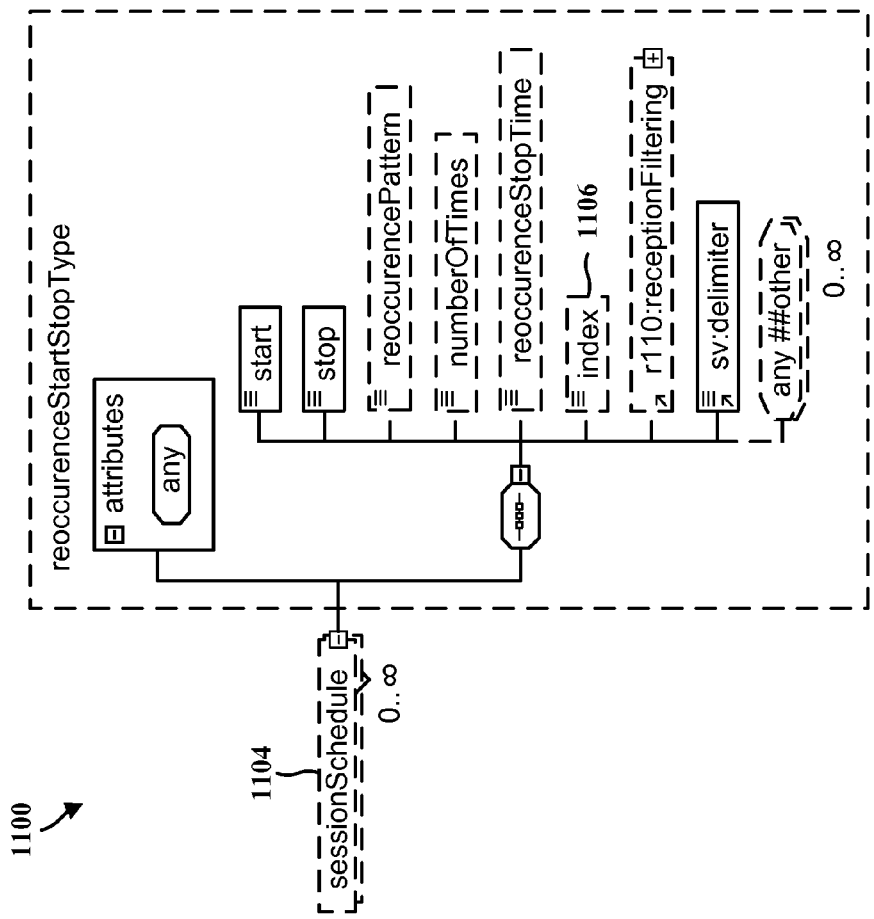
FIG. 11 is an illustration of a session schedule.

File Repair Based on Schedule Description (File Schedule Unavailable):

In another technique where a file schedule element 906 is not included in a schedule description fragment 902, a UE may obtain file information from a session schedule element 904, and trigger full file repair of a file of interest. With reference to FIG. 11, in this procedure, there is no change to the session schedule element 1104. The main difference is that the UE, on failing to access a session and on being unable to get any FDT describing the files broadcast in the session, retrieves a more up to date schedule description that also includes the file schedule of files available through the file repair server.

In this procedure, the UE may query the eMBMS server for broadcast file information by querying for the latest version of the schedule description fragment 902 for the session during which the file of interest is being broadcast. The broadcast file information may be included in a file schedule 906 that is included in the latest version of the schedule description fragment 902. The scheduled description fragment 902 may be received by the UE through a unicast transmission. In one aspect the UE may query for a schedule description of a session identified by a service identifier included in a universal service description (USD) or by a session index 1106 included in a session schedule 1104. In another aspect the UE may use a unicast channel to get the latest version of the schedule description fragment 902 which provides a file schedule 906 if file repair is enabled as per the Associated Delivery Procedure fragment. Note that the schedule description fragment is identified by a URI in the service announcement, and in one embodiment, this file URI could be used to retrieve an updated version of the schedule description fragment from the file repair server.

A UE may implement full file repair based on schedule description when a file schedule is not initially available as follows: First, the UE determines capture is active on a broadcast service with a session schedule announced in a service announcement. For example, based on information included in the service announcement, the UE may determine that a file of interest may be broadcast on a corresponding eMBMS bearer.

Next, the UE tries to access the eMBMS bearer to initiate file download. If the UE is out of service due to a weak eMBMS signal, or the UE is out of coverage of the eMBMS broadcast, or the UE is unable to switch to the frequency on which the service is broadcast, or the UE cannot receive the eMBMS broadcast for any other reason (radio resource issues, too many bearers active, etc) then the UE is unable to download the file of interest and a potential failure to download the files is established. In this case, the UE queries for an updated schedule description 902 of the session including a file schedule 906 if file repair is available.

Next, based on the schedule description 902, the UE determines the files in the session and their MD5s, if specified. For example the UE may review the files listed in a file schedule 906 and the corresponding versions as provided by the MD5s to determine if any of the files correspond to newer versions of files present on the UE. If a file of interest is found, the UE may trigger a full file repair for the file of interest. The repair may be triggered at the end of the session/file schedule, as provided by the latest updated schedule description fragment 902.

Thus, in this procedure, the UE determines that a file of interest is transmitted or will be transmitted by a service. To this end, the UE may obtain file broadcast information, e.g., through reception of a service announcement including a session schedule having file information, and by querying for an updated session schedule 904 having a file schedule with file version information. The UE processes file information to determine if any files identified in the broadcast information correspond to a file of interest. Based on the session schedule, the UE may determine that a file of interest may be broadcast during the session. Based on the file schedule 906, the UE may determine if a file of interest was broadcast during the session. Accordingly, the UE determines that a file of interest is transmitted by a service based on information included in an updated schedule description, which may be obtained via a unicast transmission.

Next, the UE determines a failure to download the file of interest. To this end, as described above, the UE determines that it cannot access the eMBMS bearer to initiate a download and then queries for an updated schedule description.

Next, if there was a failure to download a file of interest, the UE may trigger a repair procedure of the file of interest at a time corresponding to an end of a file delivery event. To this end, the UE establishes a connection with the file repair server where the file of interest is located and requests the file. The UE receives the file from the file repair server through a unicast transmission.

File Repair Based on a Session Index (File Schedule Unavailable):

In another technique applicable to instances where a schedule description fragment 902 may not provide a file schedule element 906, a UE may trigger full file repair of a file of interest based on session index information 916 included in a session schedule element 904 of a schedule description fragment 902.

In this approach a session index 916 that uniquely identifies a session may be used to identify retransmissions in the schedule description 902. For example the session index 916 can be used to identify repeated sessions in the schedule description. The session index 916 is associated with content. If the current session carries the same files as a previous session then the same index is used to broadcast the session.

UE behavior for full file repair based on session index 916 when file schedule is not available is as follows: First, the UE determines capture is active on service with session schedule announced in service announcement. For example, the UE may determine that a file of interest is being broadcast on a corresponding eMBMS bearer.

Next, if the UE determines that the current session index 916 matches a previous session index for which all files of interest were received successfully, the UE does not initiate any download on the repeated session. If the UE determines that the current session index 916 does not match a previous session index for which all the files of interest were received successfully, the UE initiates full file repair on the repeated session.

Thus, in this procedure, the UE determines that a file of interest is transmitted within a service. The UE determines that a file of interest is transmitted within a service based on a comparison between an index associated with files broadcast during a previous session and an index associated with files broadcast during a current session. If the indexes do not match, the UE may conclude there is a file of interest. The UE then determines a failure to download the file of interest. This may be done as described for previous techniques. The UE may then trigger a repair procedure of the file of interest at a time corresponding to an end of a file delivery event. This too may be done as described for previous techniques.

File Repair Based on Implicit FDT (No MD5 in File Schedule):

In a technique for use when a file schedule element 906 is available but does not include file version information, e.g. no MD5, a UE may trigger full file repair upon determining a file of interest based on an implicit FDT location. Because the schedule description fragment 902 does not provide a MD5 908 for a file URI in the file schedule element 906, the UE is unable to determine the version of the file corresponding to the URI and is thus unable to determine if the corresponding file is a file of interest.

In this scenario, a UE may implement full file repair based on an implicit FDT as follows: First, the UE determines that a file included in the file schedule 906 is a file of interest. For example, the UE may determine the URI 910 identified in the file schedule 906 is a file of interest based on having previously downloaded the file.

Next, the UE tries to access the corresponding eMBMS bearer to initiate download of the file of interest. If the UE is out of service or out of coverage of the eMBMS or the frequency on which the file is broadcast via eMBMS is inaccessible to the UE, then the UE is unable to download the file of interest. The URI 910 included in the file schedule 906 includes FDT information that may include the MD5 of the file of interest. The FDT location may be implicit based on the file URI, e.g., same directory of the URI but file name is "FDT." The UE downloads the FDT that contains the MD5 of the file of interest. Then, the UE may trigger file repair at file schedule end or session schedule end. For example, the UE may start the associated delivery procedure when the end of the file transmission time is reached. The end of the file transmission time may be included in the end attribute 912 of the file schedule element 906. Alternatively, the UE may start the associated delivery procedure at the end of a session. The end of the session time may be determined based on the stop attribute 914 of the session schedule element 904.

Thus, in this procedure, the UE determines that a file of interest is transmitted within a service. The UE determines that a file of interest is transmitted within a service based at least in part on information included in a FDT obtained through an FDT locator implicitly determined from the locator of the file of interest. For example, the UE may determine the URI 910 identified in the file schedule 906 is a file of interest based on having previously downloaded the file. The UE then determines a failure to download the file of interest. This may be done as described for previous techniques. The UE then triggers a repair procedure of the file of interest at a time corresponding to an end of a file delivery event. This too may be done as described for previous techniques.

File Repair Based on Query (No MD5 in File Schedule):

In another technique for use when a file schedule element 906 is available but does not include file version information, e.g. no MD5, a UE may trigger file repair upon determining a file of interest based on a query. In this case, because the UE does not have MD5 information, it is unable to determine the version of files scheduled for download, and is thus unable to determine if any of the files schedule for broadcast are files of interest. The UE, however, is provided with a query procedure that allows the UE to inquire about the latest MD5 of a file on the file repair server.

A UE may implement full file repair based on a query as follows: First, the UE determines that a file included in the file schedule 906 may be a file of interest. For example, the UE may compare its files with the files listed in the file schedule to determine if any files in the file schedule were previously downloaded by the UE. Any previously downloaded file would be considered a possible file of interest.

Next, the UE tries to access the corresponding eMBMS bearer to initiate download of the file of interest. If the UE is out of coverage or the frequency on which the file is broadcast via eMBMS is inaccessible to the UE, then the UE is unable to download the file of interest. In this case, the UE requests the latest MD5 information on a possible file of interest included in the file schedule 906, from a file repair server. If the file version information provided by the latest MD5 information does not match the version of the file currently on the UE, the UE concludes the file is a file of interest. Then, the UE may trigger file repair at file schedule end or session schedule end. For example, the UE may start the associated delivery procedure when the end of the file transmission time is reached. The end of the file transmission time may be included in the end attribute 912 of the file schedule element 906. Alternatively, the UE may start the associated delivery procedure at the end of a session. The end of the session time may be determined based on the stop attribute 914 of the session schedule element 904.

Thus, in this procedure, the UE determines that a file of interest is transmitted within a service. The UE determines that a file of interest is transmitted within a service based at least in part on information received by querying for a latest MD5 file. The UE then determines a failure to download the file of interest. This may be done as described for previous techniques. The UE then triggers a repair procedure of the file of interest at a time corresponding to an end of a file delivery event. This too may be done as described for previous techniques.

File Repair Based on a Conditional Get (No MD5 in a File Schedule):

In another technique for use when file version information, e.g., MD5, is not available, a UE may trigger file repair upon determining a file of interest based on a conditional get procedure. In this case, because the UE does not have MD5 information, the UE is unable to determine the version of files scheduled for download, and is thus unable to determine if any of the files schedule for broadcast are files of interest. Web servers allow conditional gets based on tags of files ("etags"). The conditional get is directed to the latest version of the file and the etag of the file is the file's MD5 signature. Conditional get (with conventional HTTP server) with if-none-match: "MD5_Of_Latest_Version_onUE" would return the file if a new version is available based on the etag remaining the same, or return "Not Modified" in case of no change to the file.

A UE may implement full file repair based on a conditional get as follows: First, the UE determines that a file included in the file schedule 906 is a file of interest and that the file was previously downloaded by the UE. For example, the UE may compare its files with the files listed in the file schedule 906 to determine if any files in the file schedule were previously downloaded by the UE. Any previously downloaded file would be considered a possible file of interest.

Next, the UE tries to access the corresponding bearer to initiate download of the file of interest. If the UE is out of coverage or the frequency on which the file is broadcast via eMBMS is inaccessible to the UE, then the UE is unable to download the file of interest. Then, the UE may trigger file repair at file schedule end or session schedule end. For example, the UE may start the associated delivery procedure when the end of the file transmission time is reached. The end of the file transmission time may be included in the end attribute 912 of the file schedule element 906. Alternatively, the UE may start the associated delivery procedure at the end of a session. The end of the session time may be determined based on the stop attribute 914 of the session schedule element 904.

At the time of downloading the file as part of the full file repair, the UE does a conditional get and requests the file only if the etag of the file on the server is different than the MD5 of the current version of the file on the UE. To do this, the etag of the file on the conventional HTTP file repair server be set to the MD5 of the file version currently being served by the http server.

Thus in this procedure, the UE determines that a file of interest is transmitted within a service. The UE determines that a file of interest is transmitted within a service based on a comparison of an identifier, e.g., MD5 signature, of the latest version of the file with a previously download version of the file. The UE then determines a failure to download the file of interest. This may be done as described for previous techniques. The UE may then triggers a repair procedure of the file of interest at a time corresponding to an end of a file delivery event. This too may be done as described for previous techniques.

File Repair Based on Conventional HTTP Server Support with Schedule Description Fragment:

In the current LTE specification 3GPP TS 26.346, version 12.1, section 3.5.1, a FDT may include: "Alternate-Content-Location-1" and "Alternate-Content-Location-2" elements that provide the references to a file repair server resource via the "xs:anyURI" value. At least one "Alternate-Content-Location-1" element is present in the FDT if byte-range based file repair is to be supported by the network. The "Base-URL-1" and "Base-URL-2" elements, when present, provide base URLs against which to resolve a relative reference included in any "Alternate-Content-Location-1" or "Alternate-Content-Location-2" element, respectively. The "Availability-Time" attribute, when present, provides a method to inform the UE of an absolute time according to the UTC time standard until which the UE can expect that, if reachable and functioning, the file repair server will return the requested repair data.

Figure 12:
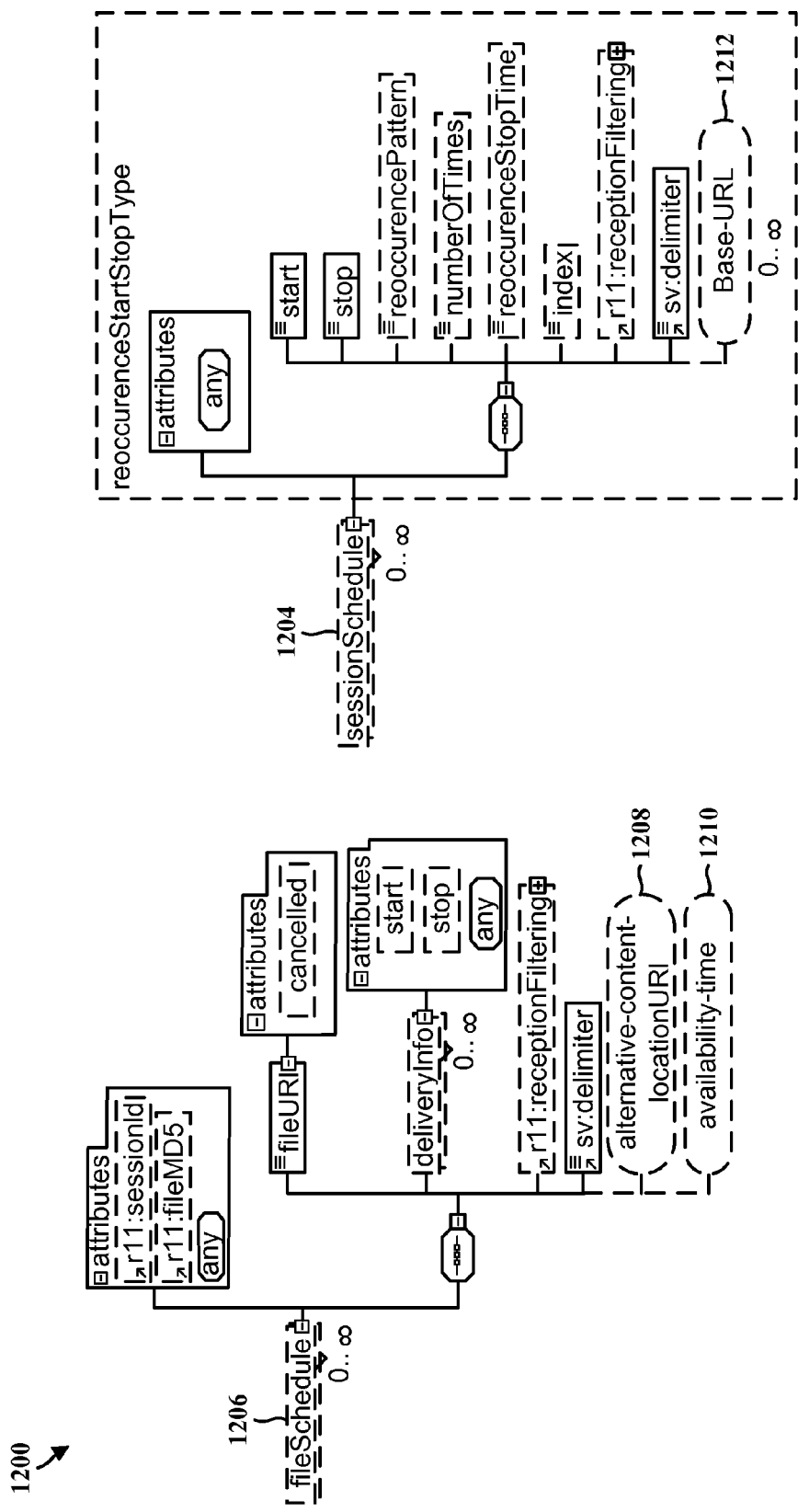
FIG. 12 is an illustration of a file schedule including an alternative-content-location attribute and an availability-time attribute.

Two options for full file repair may be provided with the conventional HTTP server support with schedule description fragment approach. In a first option, FDT retrieval may be used as described above with respect to file repair based on FDT, to obtain conventional HTTP server locations as outlined in FDT. In a second option, similar support is added in the session schedule 1204 to support conventional HTTP servers as shown in FIG. 12. This enhancement works best with the above-described full file repair based on query and full file repair based on conditional get.

Figure 13:
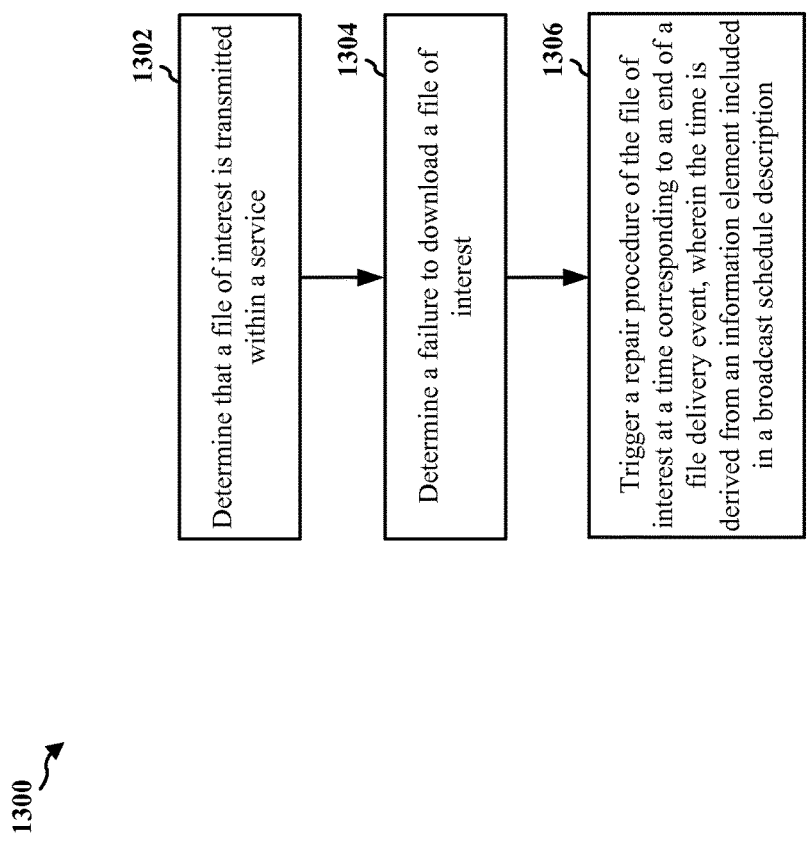
FIG. 13 is a flow chart of a method of wireless communication.

FIG. 13 is a flow chart 1300 of a method of wireless communication. The method may be performed by a UE. At step 1302, the UE determines that a file of interest is transmitted within a service. Such a determination by the UE may be based on information included in, or obtained through, a schedule description fragment. The UE may determine that a file of interest is transmitted within a service based at least in part on information included in a FDT obtained through an FDT locator included in a schedule description of a session. The UE may determine that a file of interest is transmitted within a service based at least in part on information included in a FDT obtained through an FDT locator implicitly determined from the locator of the file of interest. The UE may determine that a file of interest is transmitted within a service based at least in part on information included in an updated schedule description. The updated schedule description may be obtained through unicast.

The UE may determine that a file of interest is transmitted within a service based at least in part on information included in a schedule description of a session of interest. The information element may be a FDT locator and the UE may determine that a file of interest is transmitted within a service based at least in part on information in the FDT. The UE may determine that a file of interest is transmitted within a service based at least in part on information received by querying for a latest MD5 file. The UE may determine that a file of interest is transmitted within a service based on a comparison of an identifier of the latest version of the file with a previously download version of the file. The identifier may be an MD5 signature. The UE may determine that a file of interest is transmitted within a service based on a comparison between an index associated with files broadcast during a previous session and an index associated with files broadcast during a current session.

At step 1304, the UE determines a failure to download the file of interest. In one configuration, the UE determines there was a failure to download a file of interest, by checking to see if the UE received the file of interest at the end of the broadcast session. The UE is aware of the end of the broadcast session based at least in part on information included in a session schedule element, and the version identification of the file of interest based at least in part on information included in the file schedule (e.g., MD5) or obtained through the file schedule (e.g., through a FDTlocationURI). Accordingly, at the end of the broadcast session, the UE compares the version of the file currently in the UE with the version of the file of interest broadcast during the session. If the versions do not match, then the UE may conclude there was a failure to download a file of interest.

At step 1306, the UE triggers a repair of the file of interest at a time corresponding to an end of a file delivery event, wherein the time is derived from an information element included in the schedule description. In one implementation, the file delivery event comprises a file broadcast, the information element comprises a file schedule element, and the time of the repair trigger corresponds to the end of the file broadcast. In another implementation, the file delivery event comprises a session broadcast, the information element comprises a session schedule element, and the time of the repair trigger corresponds to the end of the session broadcast.

Figure 14:
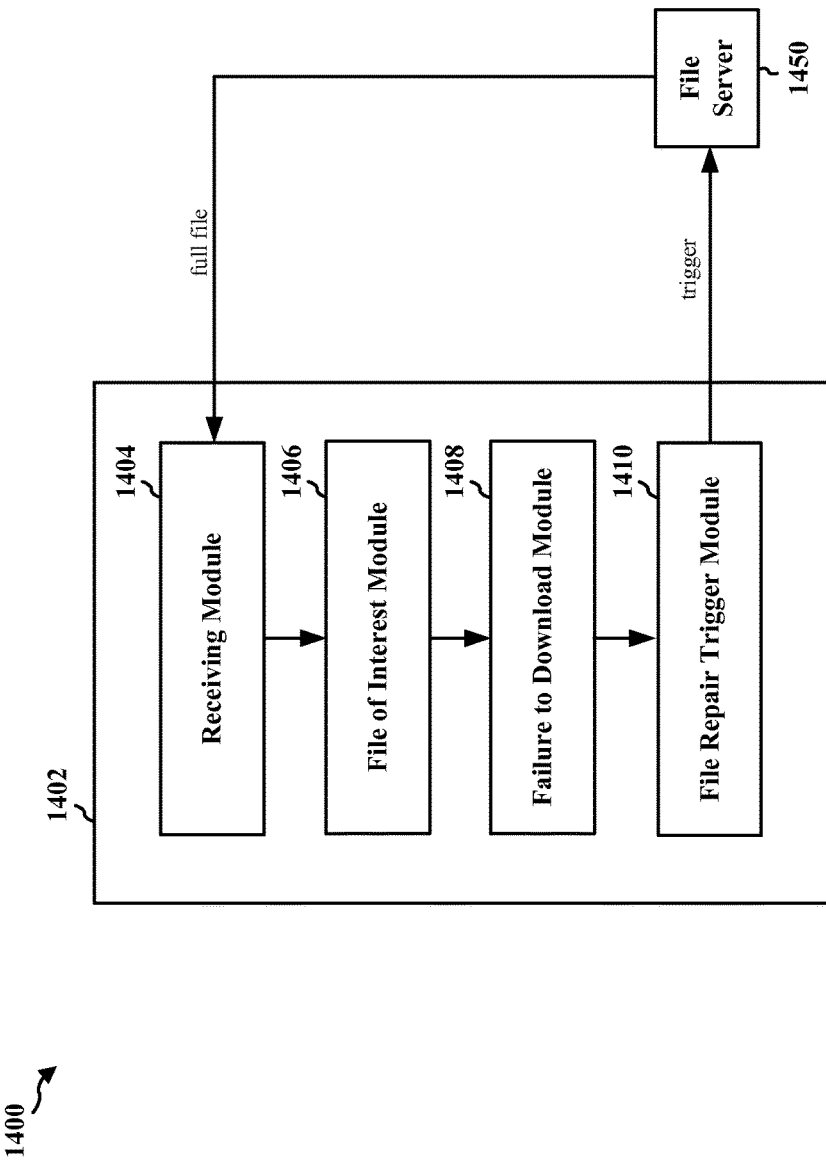
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus 1402 includes a receiving module 1404 that receives file information (e.g., schedule description, session schedule, file schedule) from a server corresponding to files transmitted within a service, a file-of-interest module 1406 that determines that a file of interest is transmitted within a service, a failure-to-download 1408 that determines a failure to download the file of interest, and a file repair trigger module 1410 that triggers a repair of the file of interest at a time corresponding to an end of a file delivery event, wherein the time is derived from an information element included in the schedule description.

Figure 15:
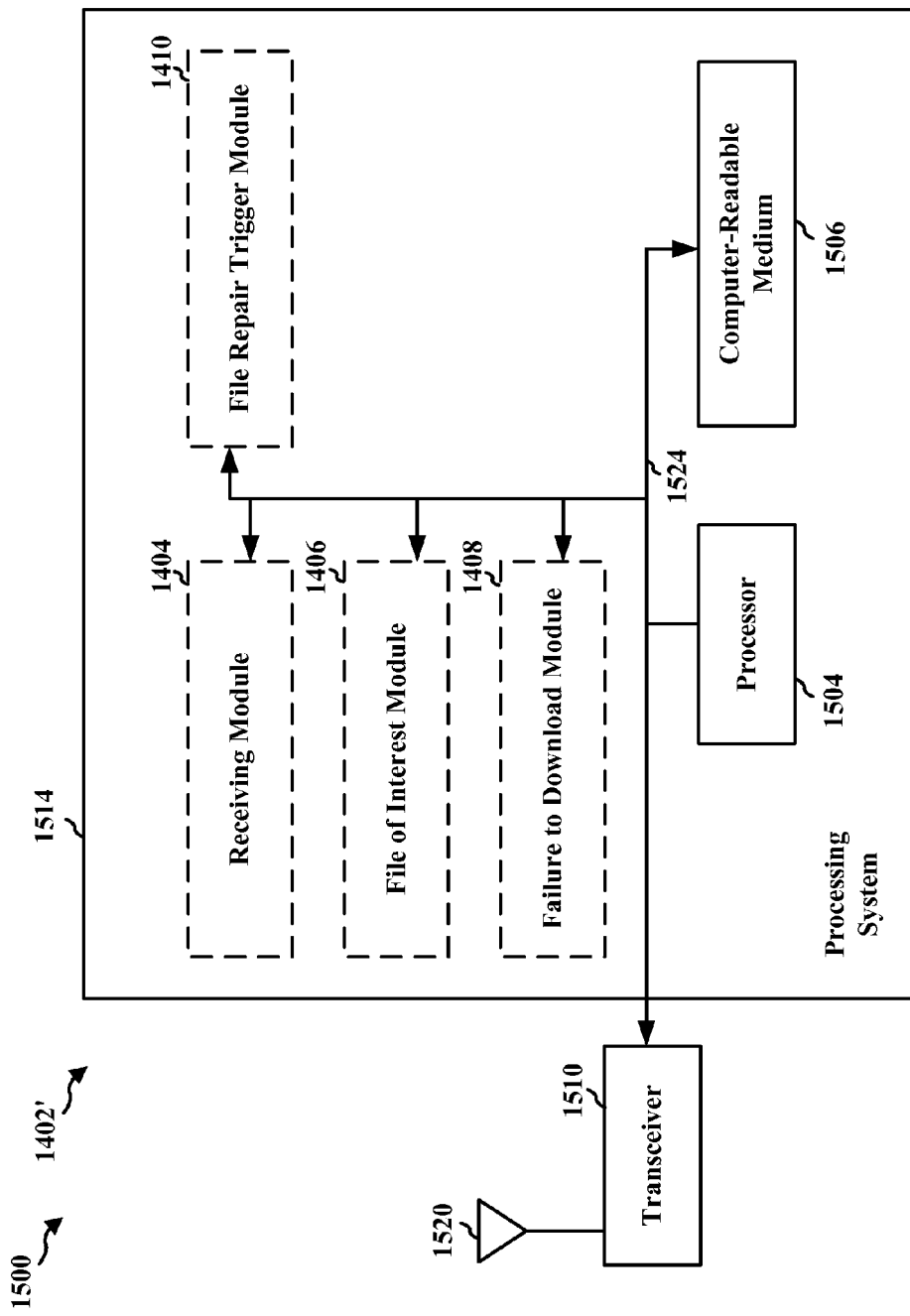
FIG. 15 is a diagram illustrating an example of a hardware implementation for an apparatus employing a processing system.

The apparatus may include additional modules that perform each of the steps of the algorithm in the aforementioned flow charts of FIG. 13. As such, each step in the aforementioned flow charts of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410 and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514. In addition, the transceiver 1510 receives information from the processing system 1514, and based on the received information, generates a signal to be applied to the one or more antennas 1520. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408 and 1410. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for determining that a file of interest is transmitted within a service, means for determining a failure to download the file of interest; and means for triggering a repair of the file of interest at a time corresponding to an end of a file delivery event, wherein the time is derived from one or more information elements included in the schedule description.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), comprising:
   by the UE, receiving a service announcement for a service, the service announcement including a broadcast schedule description, the broadcast schedule description including:
      a file schedule element for a file transmitted within the service, the file schedule element including an attribute that indicates an end time of the file's transmission;
   by the UE, in response to the UE not receiving the file via an MBMS bearer and the UE not receiving a file delivery table (FDT) instance associated with the file via an MBMS bearer, deriving the end time of the file's transmission from the attribute of the file schedule element of the broadcast schedule description of the service announcement for the service; and
   by the UE, triggering a repair procedure of the file at a time based on the end time of the file's transmission that the UE derived from the attribute of the file schedule element of the broadcast schedule description of the service announcement for the service.

2. A method of wireless communication of a user equipment (UE), comprising:
   by the UE, receiving a service announcement for a service, the service announcement including a broadcast schedule description, the broadcast schedule description including:
      a session schedule element for a session containing a file transmitted within the service, the session schedule element including an attribute that indicates an end time of the session;
   by the UE, in response to the UE not receiving the file via an MBMS bearer and the UE not receiving a file delivery table (FDT) instance associated with the file via an MBMS bearer, deriving the end time of the session from the attribute of the session schedule element of the broadcast schedule description of the service announcement for the service; and
   by the UE, triggering a repair procedure of the file at a time based on the end time of the session that the UE derived from the attribute of the session schedule element of the broadcast schedule description of the service announcement for the service.

3. The method of claim 2, wherein the session schedule element of the broadcast schedule description of the service announcement for the service further includes an FDT locator that indicates a location of a first FDT instance associated with the file; and
   wherein the repair procedure of the file includes:
      using the FDT locator to obtain the first FDT instance associated with the file.

4. An apparatus for wireless communication, comprising:
   a memory; and
   at least one processor coupled to the memory and configured to:
      receive a service announcement for a service, the service announcement including a broadcast schedule description, the broadcast schedule description including:
         a file schedule element for a file transmitted within the service, the file schedule element including an attribute that indicates an end time of the file's transmission;
      in response to not receiving the file via an MBMS bearer and not receiving a file delivery table (FDT) instance associated with the file via an MBMS bearer, derive the end time of the file's transmission from the attribute of the file schedule element of the broadcast schedule description of the service announcement for the service; and
      trigger a repair procedure of the file at a time based on the end time of the file's transmission that was derived from the attribute of the file schedule element of the broadcast schedule description of the service announcement for the service.

5. An apparatus for wireless communication, comprising:
   a memory; and
   at least one processor coupled to the memory and configured to:
      receive a service announcement for a service, the service announcement including a broadcast schedule description, the broadcast schedule description including:
         a session schedule element for a session containing a file transmitted within the service, the session schedule element including an attribute that indicates an end time of the session;
      in response to not receiving the file via an MBMS bearer and not receiving a file delivery table (FDT)

instance associated with the file via an MBMS bearer, deriving the end time of the session from the attribute of the session schedule element of the broadcast schedule description of the service announcement for the service; and triggering a repair procedure of the file at a time based on the end time of the session that was derived from the attribute of the session schedule element of the broadcast schedule description of the service announcement for the service.

6. The apparatus of claim 5, wherein the session schedule element of the broadcast schedule description of the service announcement for the service further includes an FDT locator that indicates a location of a first FDT instance associated with the file; and wherein the repair procedure of the file includes:
  using the FDT locator to obtain the first FDT instance associated with the file.

* * * * *